(12) United States Patent
Palmer et al.

(10) Patent No.: US 7,608,572 B2
(45) Date of Patent: Oct. 27, 2009

(54) CAR WASH INDICATORS

(75) Inventors: Tracy Palmer, Fallbrook, CA (US); William A Farone, Irvine, CA (US)

(73) Assignee: 3K Technologies Ltd, Honolulu, HI (US)

( * ) Notice: Subject to any disclaimer, the term of this patent is extended or adjusted under 35 U.S.C. 154(b) by 0 days.

(21) Appl. No.: 11/555,037

(22) Filed: Oct. 31, 2006

(65) Prior Publication Data

US 2008/0103082 A1     May 1, 2008

(51) Int. Cl.
- *C11D 1/00* (2006.01)
- *C11D 3/40* (2006.01)
- *C11D 3/44* (2006.01)

(52) U.S. Cl. ............... 510/189; 510/419; 510/432; 510/437; 510/466; 510/505

(58) Field of Classification Search ............ 510/189, 510/419, 432, 437, 466, 505
See application file for complete search history.

(56) References Cited

U.S. PATENT DOCUMENTS

| | | | |
|---|---|---|---|
| 4,128,506 A | 12/1978 | Hegedus et al. | |
| 4,824,827 A | 4/1989 | Kelly et al. | |
| 4,906,395 A | 3/1990 | Stoesser et al. | |
| 5,759,980 A | 6/1998 | Russo et al. | |
| 5,929,004 A * | 7/1999 | Ushijima et al. | 510/100 |
| 6,221,433 B1 | 4/2001 | Muntz et al. | |
| 6,677,287 B1 * | 1/2004 | Willman et al. | 510/214 |
| 2004/0120915 A1 | 6/2004 | Yang et al. | |
| 2005/0155628 A1 | 7/2005 | Kilkenny et al. | |
| 2006/0062923 A1 | 3/2006 | Dilley et al. | |
| 2006/0135394 A1 | 6/2006 | Smith et al. | |

FOREIGN PATENT DOCUMENTS

| | | |
|---|---|---|
| WO | WO2004048461 | 6/2004 |
| WO | WO2005072497 | 8/2005 |

* cited by examiner

*Primary Examiner*—Brian P Mruk
(74) *Attorney, Agent, or Firm*—C. H. O'Donohue

(57) ABSTRACT

A formulation and a method of using the formulation for washing vehicles and vehicular tires comprising a surface protecting composition that removes soil while enhancing the gloss, providing a protecting layer, and is biodegradable, environmentally and consumer friendly. The formulation further pertains to a product which contains a highly biodegradable surface active agent that is impervious to hard water and can clean a surface with little mechanical action. The residual protective coating aids in the removal of any subsequent dirt and grime that the surface may collect.

20 Claims, No Drawings

CAR WASH INDICATORS

FIELD OF THE INVENTION

The present invention is a formulation and method of use for washing vehicles and vehicular tires. It pertains to a surface protecting composition that removes soil while enhancing the gloss, providing a protecting layer, and is biodegradable, environmentally friendly, and consumer friendly. In particular the present invention pertains to a product which contains a highly biodegradable surface active agent that is impervious to hard water and can clean a surface with little mechanical action. The residual protective coating of the present invention is slightly water soluble and aids in the removal of any subsequent dirt and grime that the surface may collect. A further property of this formulation is the lessening of the attraction of dirt and grime to the surface.

Car Wash Formulations

The typical car wash product includes a conventional soap or detergent, e.g. an anionic surfactant, cationic and nonionic surfactants which may also be used, as well as a mixture of surfactants. These compositions frequently contain conventional detergent builders that neutralize any hard minerals that are dissolved in the water. Among the group of useful anionic surfactants that can be used are alkali metal paraffin sulfonates. After washing, the surface is rinsed with water to remove the car wash formulation and any dirt entrained within.

Dissolved minerals such as calcium, iron, manganese, and magnesium are contained within the water. (U.S. Pregrant Publication Number 20060135394 A1). Modern vehicles are usually finished with a protective surface and/or have been waxed and polished and thus the rinse water will bead on the surface. If these beads are not removed, then water-spotting will occur. Normally one uses a cloth and wipes the rinsed cleaned surface to physically remove any residual water.

Compositions have been developed in an attempt to eliminate or lessen the step of wiping the vehicles dry after the rinse steps. An example of such a product is detailed by Russo et al. in U.S. Pat. No. 5,759,980. These products are not meant to be ingested, used on the skin or considered environmentally friendly.

In order to add enhancements to the side walls of vehicular tires petroleum distillates are used as a carrier. When these volatile solvents that are similar to diesel fuel and kerosene evaporate into the atmosphere, they leave the waxy or a similar material behind to enhance or add to the shine on the tires.

Organopolysiloxane compounds have been used in sprayable aqueous protectant products. (U.S. Pat. No. 6,221,433). These formulations typically also include polyacrylic acid thickeners, and frequently solid inorganic materials such as clay minerals to enhance the gloss are included. Plasticizers are used and these include dialkylphthalates, triarylphosphates such as tricresylphosphate, and a variety of liquid polymeric oligomers. These compounds are not considered environmental friendly and may be harmful if ingested or applied directly to one's skin.

Use of Formulations

Present products come either (1) ready to use in primarily aqueous solutions or (2) in a concentrated formulation requiring dilution with water. If the product is already diluted and ready to use, the customers has no control of the concentration of the active ingredients. Concentrated products come with standardized dilution instructions and these do not take into account the quality; i.e., hardness, of the water. Both types of products do not take into account the amount of dirt and grime that is on the surface of the vehicle or the tire. The consumer has no means to determine when the concentrate has been diluted to the appropriate strength for both the water quality and the degree of soil on the object to be cleansed.

Stoesser et al in U.S. Pat. No. 4,906,395 developed a detergent package for laundering clothes wherein the package contained an indicator strip that underwent a physical change upon contact with a sample of water. The strip contained 5 dots and depending on the color of the dots, one then used a predetermined amount of detergent based on the container cap volume. Cresolphthalein complexone was one of the indicators used determine the hardness of the water.

All publications, including patents, published patent applications, scientific or trade publications and the like, cited in this specification are hereby incorporated herein in their entirety.

Environmentally Friendly Ingredients

There is no product that can be said to be completely safe if it is effective in cleaning environmental soil from automobiles and similar vehicles. That is, most products intended for cleaning and waxing are not meant to be ingested, used on the skin or splashed in the eyes. However there are selected chemicals that are environmentally friendly as well as consumer friendly that can be used with minimal risk to both the environs and humans.

Many products for both waxing and shining have petroleum distillates in them. Use of these products is similar to pouring gasoline on the ground. That is, the volatile solvents that are similar to those in diesel fuel and kerosene evaporate into the atmosphere leaving the "wax" or similar substance behind. These products are perfectly legal and their contribution to the overall burden of air pollution is an unknown factor but they can be considered polluters.

Some of the formulations in this instant invention contain an ingredient that is activated by light so that there is energy returned from this ingredient when light is incident upon it. It provides a soft glow or "fluorescence". The efficiency is dependant on the type of tire type but all tires exhibited this glow characteristic after washing.

The surface active agent used in these new and novel formulations, a glycerol product, is highly biodegradable, relatively impervious to hard water and can clean surfaces with little mechanical action. To assist in maintenance of the clean surface an additional ingredient is further added that leaves a coating behind and is water soluble. This material makes it easier to remove any subsequent dirt and grime that may collect on the surface.

One of the main problems in using products of the type presently used to wash vehicles is that the amount of dirt encountered and the quality of water used differs greatly from location to location and vehicle to vehicle. For household detergents for washing clothes, for example, one will find different use levels recommended depending on the amount of soil, the load size and sometimes even for the water quality as hard water may more product in some cases.

Dilution Strategies for Concentrates

The present invention involves a novel solution for the problems presented above. In household detergents for washing clothes, one will find different use levels recommended depending on the amount of soil, the load size and sometimes the quality of water is also taken into consideration. Some users try to adjust the amount of the detergents based on his/her subjective perception of how clean the final product appears. Other users base their evaluation on the level of 'suds' that they see, when the agent is diluted for washing. These methods tend to be visual perceptions and lack a degree of accuracy.

The present invention does not contain any water unlike most detergents found in ordinary households. The composition contains only active ingredients. To solve the problem of the consumer knowing when the correct amount has been added to water an indicator has been added to the formulation that changes color when the ingredients are ready for use. The color change indicates not only solubility but also is related to the concentration used. Once a customer finds the right dosage for their environment and soil, the color intensity will aid in reminding the consumer of the amount of active ingredients that they like or need to use. The indicator is only activated when the product is placed in water and ready to be utilized.

The formulation for cleaning vehicles and vehicular wheels also has an additional feature in that there is an additional ingredient that provides a 'wax' type protection without the use of petroleum distillates or similar environmentally undesirable chemicals. The surface active agent present in the formulation cleans the surface with little mechanical action and leaves a clean surface for the deposition of the protecting agent. The surface active agent would normally interfere with the deposition of the protective agent. Surprisingly the agent of the present invention does not interfere with the function of the protective agent. This protective agent makes it easier to remove subsequent dirt and grime that may collect on the surface plus it has an additional feature of reducing the amount of dirt and grime that is attracted to the surface.

Definitions

The term, vehicle, refers to any means in or by which someone travels or something is carried or conveyed; for example, automobile, truck, tractor, bicycle, cab, motorcycle, van, wagon, taxi, trailer, RV, camper, The term, vehicular tire, refers to a ring or band of rubber, either solid or hollow and inflated, or of metal, placed over the rim of a wheel to provide traction, resistance to wear, for other desirable, properties and includes the wheel which may be a solid disk or a rigid circular ring connected by spokes to a hub, designed to turn around or revolve on an axle.

The term, soil, refers to dirt, brake grime, brake dust, road grime, road dirt, mud, filth, strains grease; i.e., the state of being covered with unclean things.

The following chemical names used herein and their common or trademark names/synonyms and associated CAS Registry number:

Tween 20; Polysorbate 20; peg sorbitan laurate; polyoxyethylene sorbitan monolaurate; RN 9005-64-5.

Tween 80; Polysorbate 80; polyoxyethylene sorbitan monoleate; glycol; RN 9005-65-6.

DETAILED DESCRIPTION

The present invention is drawn to a composition for washing vehicles or vehicular tires comprising an alcohol, an indicator dye, a non-aqueous solvent, a coating agent to prevent soil attachment and a biodegradable surface active agent. The indicator dye changes color when the composition is diluted with sufficient water to the active concentration to effectively clean vehicles and vehicular tires and to deposit the coating agent on vehicles and vehicular tires after removal of the soil. In one embodiment the non-aqueous solvent is selected from the group consisting of propylene glycerol, glycerin. and mixtures thereof. In an additional embodiment the alcohol of the formulation is selected from the group consisting of ethanol, methanol, isopropyl alcohol, propyl alcohol and mixtures thereof. In a further embodiment the alcohol is ethanol or denatured ethanol and the concentration of the alcohol is about 10% (w/w) to about 55% (w/w).

In another embodiment the indicator dye in the formulation is selected from the group consisting of methyl red, bromocresol purple and bromocresol green. Between about 0.01% to about 0.50% (w/w) of the indicator dye is added to the formulation in a further embodiment. Optionally an indicator dye intensifier may be added to the composition. In one embodiment the indicator dye intensifier is salicylic acid.

Glycerol fatty acid monoesters, glycerol fatty acid diesters, sorbitol fatty acid monoesters, sorbitol fatty acid diesters, sucrose esters, and mixtures are included in the group of coating agents that are present in the composition. In a further embodiment polysiloxane is the coating agent. The coating agent leaves a protective coating on the treated surface. This coating is slightly water soluble which enables the surface to shed soil when water is further applied to the surface after a time interval. In one embodiment the coating agent's concentration is between about 0.1% to about 3.0% (w/w).

In one embodiment the composition comprises an optional scent formulation. A further embodiment the scent formulation comprises one or more scent selected from the group consisting of lime, lemon, blood orange, lavender, pine, orange oil, and cedar.

In an additional embodiment the formulation for washing vehicles comprises ethanol, methyl red, and polysiloxane. A further embodiment for washing vehicular tires comprises ethanol; bromocresol purple; and polysiloxane. In a further embodiment a formulation for providing a luster or glow to tires comprises ethanol, bromocresol green, and polysiloxane.

In further embodiments for washing vehicles or vehicular tires the concentrations of ingredients comprise between about 10% (w/w) to about 55% (w/w) alcohol, between about 0.01% (w/w) to about 0.50% (w/w) of an indicator dye, between about 50% (w/w) to about 70% (w/w) of a non-aqueous solvent, between about 10% to about 20% biodegradable surface active agent, and between about 0.1% (w/w) to about 3.0% (w/w) of a coating agent.

In one embodiment there is provided a method of cleaning the surface of a vehicle or vehicular tires which includes the steps of (a) diluting a composition with water, (b) monitoring color change, and (c). ceasing water addition at indicated color point.

The embodiments and examples discussed and disclosed in the present application are illustrative only and do not exclude the use of other materials and/or other components, such as optional scent components and optional indicator dye color intensifiers. For example, addition of between about 0.25% to 2.5% of scent to the mixture results in a formulation in which the characteristics of the finished composition have not changed. Addition of an optional dye intensifier material affects the intensity of the color and not the characteristics of the final composition.

EXAMPLES

The following Examples illustrate certain aspects and advantages of the present invention, which should be understood not to be limited thereby.

Example 1

Wheel Wash Formulation

The wheel wash formulation was produced by mixing 2250 grams of ethanol with a dye (i.e., 2.25 grams of bromocresol purple). The optional scent (75 grams of lime) was added to the ethanol dye mixture and the materials were mixed well. A separate container was used to mix 6863 grams of propylene glycol, 1687 grams of Tween 20 and 50 grams of polysiloxane. The propylene glycol mixture was mixed into the previously prepared ethanol mixture. When bromocresol purple was used, the formulation mixture had a yellow color and turned purple when added to water. The utilization of bromocresol green gave a green mixture which upon addition to water the formulation color turned to a brilliant blue color

Example 2

Wheel Wash Formulation

Another wheel wash formulation was produced in the manner described above, with the following compounds and quantities: 20.21 grams of ethanol, 15.3 grams of Tween 20 and 3.0 grams of a lime scent. For this formulation 0.04 grams of bromocresol green was utilized as the color changing indicator dye.

Example 3

Wheel Wash Formulation

As in earlier examples, 19.9 grams of ethanol were mixed with 3.0 grams of lime scent, and 0.04 grams of bromocresol purple. This mixture was added to a mixture of 15.39 grams of Tween 20 and 62.25 grams of propylene glycol.

Example 4

Wheel Wash Formulation

As given in the previous examples, a further formulation was produced using 360 grams of ethanol, 270 grams of Tween 20, and 1098 grams of propylene glycol. This formulation also contained 9.0 grams of lime scent and 9.0 grams of lemon scent. The indicator dye was 0.54 grams of bromocresol purple.

Example 5

Wheel Wash Formulation

An additional formulation, prepared as described above, consisted of 2250 grams of ethanol, 50 grams of polysiloxane, 6863 grams of propylene glycol, and 1687 grams of Tween 20. In this particular formulation 75 grams of lime scent were used and 2.25 grams of bromocresol purple as the indicator dye.

Example 6

Car Wash Formulation

The car wash formulation was produced by mixing ethanol (500 grams), methyl red indicator (0.5 grams) and blood orange scent (25 grams) together. In a separate container Tween 20 (375 grams), glycerin (1525 grams), optionally salicylic acid (2.5 grams) and polysiloxane (25 grams) were mixed together. The Tween mixture was added to the previously produced ethanol mixture and mixed well. The color upon mixing was a deep red color. When the formulation was added to water it turned bright yellow.

Example 7

Car Wash Formulation

The car wash formulation was produced as above in Example 6 except that Tween 20 was substituted by an equivalent amount of Tween 80.

Example 8

Car Wash Formulation

An additional car wash formulation was produced by mixing 4500 grams of ethanol, 4.5 grams of methyl red indicator, 75 grams of blood orange and 150 grams of orange oil scents. In a separate container 100 grams of polysiloxane, 3375 grams of Tween 20, 13725 grams of glycerin and 23.5 grams of the optional salicylic acid were mixed together. Again upon mixing the Tween composition mixture and the previously produced ethanol mixture, the formulation turned deep red in color.

Example 9

Car Wash Formulation

Utilizing the procedure given in Example 6 a further formulation was made consisting of 20.2 grams of ethanol, 0.03 grams of methyl red indicator dye, 1.02 grams of blood orange scent, 15.10 grams of Tween 80, 63.21 grams of glycerin, and 0.1 grams of salicylic acid

Example 10

Washing Vehicle

The car wash formulation as in Example 6 was diluted 1 ounce to 1 gallon of water prior to utilization to wash an automobile. Upon dilution the solution color went from a deep red to a yellow color. It was found that the color change indicated not only the right dilution but the correct solubility for the formulation within the water used in this example. The formulation cleansed the automobile and deposited the coating agent upon the vehicular surface. Two weeks after normal driving and environmental conditions, it was found that a rinse with a water hose was sufficient to remove the majority of the soil present on the surface. The formulation diluted as before was used to remove any lingering soil.

Example 11

Washing Vehicle

The car wash formulation as in Example 6 was diluted 1 ounce to 1 gallon of water prior to utilization to wash an automobile. Upon dilution the solution color went from a deep red to a yellow color. It was found that the color change indicated not only the right dilution but the correct solubility for the formulation within the water used in this example. The formulation cleansed the automobile and deposited the coating agent upon the vehicular surface. After two weeks of driving in environmental conditions dirtier (rain and mud) than example 10, slightly more soil was remained on the automobile surface after the hose rinse. The formulation diluted as previously was used to remove the residual soil.

Example 12

Washing Vehicle

The car wash formulation as in Example 8 is diluted until there is a color change from red to yellow. The solution is used to wash an automobile with normal soil present. After 1.5 weeks the automobile is washed again with the diluted formulation after the preliminary hose rinse. The soil is easily removed and the shine is restored.

Example 13

Washing Vehicle

The car wash formulation as in Example 7 is diluted until there is a color change from red to yellow. The solution is utilized to clean a motorcycle covered with normal environmental soil. After two weeks of use, the motorcycle is rinsed with a water hose. The soil on the bike is removed as well as bird droppings and the paint is not damaged.

Example 14

Washing Wheels and Rims

The wheel wash as in Example 1 was diluted 1 ounce of formulation to 1 gallon of water. The wheels were washed with normal effort and rinsed. The formulation deposited the protecting surface agent to the vehicular tires and rims. The brake dust and road soil were removed and the wheels and rims were clean and shiny. It was noted that the chrome rims glistened, especially at night. After approximately two weeks the tires and rims were rinsed with plain water. The normal road dust and brake soil present was easily removed. The tires and rims were washed again with the formulation solution to redeposit the protecting surface agent.

Example 15

Washing Wheels and Rims

The wheel wash as in Example 3 is diluted 1 ounce of formulation to 1 gallon of water. The wheels are washed with normal effect and rinsed. The brake dust and road soil are removed and the wheels and rims appear clean and shiny. The chrome rims glisten, especially at night. After approximately two weeks the tires and rims are rinsed with plain water. The normal road dust and brake soil are easily removed prior to washing with again with a solution containing the formulation.

Example 16

Washing and Shining Tires

The formulation given in Example 2 was not diluted with water but was applied directly to the actual tires themselves. The tires were easily cleaned and had a luster when rinsed and dried. When the luster on the tires was hit by light, the tires appeared to glow.

While this invention has been described with respect to various specific examples and embodiments, it is to be understood that the invention is not limited thereto and that it can be variously practiced with the scope of the following claims.

We claim:

1. A liquid composition for washing vehicles or vehicular tires comprising an alcohol, an indicator dye, a non-aqueous solvent, a coating agent to prevent soil attachment and a biodegradable surface active agent wherein said indicator dye changes color when said liquid composition is diluted with water to active concentration sufficient to effectively clean vehicles and vehicular tires and deposit said coating agent on vehicles and vehicular tires wherein water addition ceases at indicated color point by said indicator dye.

2. The composition of claim 1 wherein the non-aqueous solvent is selected from the group consisting of propylene glycerol, glycerin, and mixtures thereof.

3. The composition of claim 1 wherein the alcohol is selected from the group consisting of ethanol, methanol, isopropyl alcohol, propyl alcohol, and mixtures thereof.

4. The composition of claim 3 wherein the alcohol is ethanol or denatured ethanol.

5. The composition of claim 1 comprising between about 10% (w/w) to about 55% (w/w) alcohol.

6. The composition of claim 1 wherein said indicator dye is selected from the group consisting of methyl red, bromocresol green, and bromocresol purple.

7. The composition of claim 1 further comprising between about 0.01% to about 0.50% (w/w) of said indicator dye.

8. A liquid composition for washing vehicles or vehicular tires comprising an alcohol, an indicator dye, a non-aqueous solvent, a coating agent to prevent soil attachment and a biodegradable surface active agent wherein:
   said indicator dye changes color when said liquid composition is diluted with water to active concentration sufficient to effectively clean vehicles and vehicular tires and deposit said coating agent on vehicles and vehicular tires;
   water addition ceases at indicated color point by said indicator dye; and
   said surface active agent is selected from the group consisting of glycerol fatty acid monoesters, glycerol fatty acid diesters, sorbitol fatty acid monoesters, sorbitol fatty acid diesters, sucrose esters, and mixtures thereof.

9. The composition of claim 1 wherein said coating agent leaves a coating on the treated surface wherein the coating is slightly water soluble to shed soil when water is further applied in a later treatment.

10. The composition of claim 9 wherein said coating agent is polysiloxane.

11. The composition of claim 1 wherein said coating agent is between about 0.1% to about 3.0% (w/w).

12. The composition of claim 1 further comprising an optional scent formulation.

13. The composition of claim 1 further comprising an optional indicator dye intensifier.

14. The composition of claim 13 wherein said optional indicator dye intensifier is salicylic acid.

15. The composition of claim 12 wherein the scent formulation comprises one or more scent selected from the group consisting of lime, lemon, blood orange, lavender, pine, orange oil, and cedar.

16. A liquid formulation for washing vehicles comprising an alcohol, an indicator dye, a non-aqueous solvent, a coating agent to prevent soil attachment and a biodegradable surface active agent wherein said indicator dye changes color when said composition is diluted with water to an active concentration sufficient to effectively clean vehicles and deposit said coating agent on said vehicles.

17. The formulation of claim 16 wherein:

ethanol is said alcohol;

methyl red is said indicator dye; and the coating agent is polysiloxane.

18. A liquid formulation for washing vehicular tires comprising an alcohol, an indicator dye, a non-aqueous solvent, a coating agent to prevent soil attachment and a biodegradable surface active agent wherein said indicator dye changes color when said composition is diluted with water to an active concentration sufficient to effectively clean vehicular tires and deposit said coating agent on said vehicular tires.

19. The formulation of claim 18 wherein:

said alcohol is ethanol; said indicator dye is bromocresol purple; and the coating agent is polysiloxane.

20. A liquid composition for washing vehicles or vehicular tires comprising between about 10% (w/w) to about 55% (w/w) alcohol, between about 0.01% (w/w) to about 0.50% (w/w) of an indicator dye, between about 50% (w/w) to about 70% (w/w) of a non-aqueous solvent, between about 10% to about 20% biodegradable surface active agent, and between about 0.1% (w/w) to about 3.0% (w/w) of a coating agent wherein:

said indicator dye changes color when said composition is diluted with water to concentrations sufficient to effectively clean and deposit said coating agent on vehicles and vehicular tires.

* * * * *